United States Patent [19]

Hanson

[11] Patent Number: 4,694,237
[45] Date of Patent: Sep. 15, 1987

[54] ISOLATED POWER SUPPLY SYSTEM AND METHOD

[75] Inventor: George E. Hanson, Cedar Rapids, Iowa

[73] Assignee: Norand Corporation, Cedar Rapids, Iowa

[21] Appl. No.: 883,062

[22] Filed: Jul. 8, 1986

[51] Int. Cl.$^4$ .............................. H02J 7/00; H02J 9/00
[52] U.S. Cl. ............................................. 320/6; 307/66; 320/14; 320/15; 320/38
[58] Field of Search ...................................... 320/14–18, 320/37, 38, 6; 307/66; 323/288

[56] References Cited

U.S. PATENT DOCUMENTS

| | | | |
|---|---|---|---|
| 4,255,697 | 3/1981 | Buhler, III | 320/14 X |
| 4,323,788 | 4/1982 | Smith | 320/15 X |
| 4,325,021 | 4/1982 | McMackin | 323/288 X |
| 4,413,220 | 11/1983 | Waineo | 320/15 |
| 4,546,421 | 10/1985 | Bello et al. | 323/288 X |

Primary Examiner—R. J. Hickey
Attorney, Agent, or Firm—Neuman, Williams, Anderson & Olson

[57] ABSTRACT

In an embodiment for supplying power to sensitive telecommunications modules in an environment rich in radiated RF emissions, the AC power line is connected to a battery charger which is alternately connected to two rechargeable batteries. A third battery is connected in power transfer relation to the telecommunications modules and to a power control module, and in turn receives power from the one of the first and second batteries which is not being charged, such active battery being completely isolated from the AC power line. The third battery insures against transients and switching noise during switchover between the first and second batteries, and the power control module monitors the supply of power via an optoelectronic isolator and connects both the first and second batteries in parallel with the third battery in the event of a power failure.

23 Claims, 6 Drawing Figures

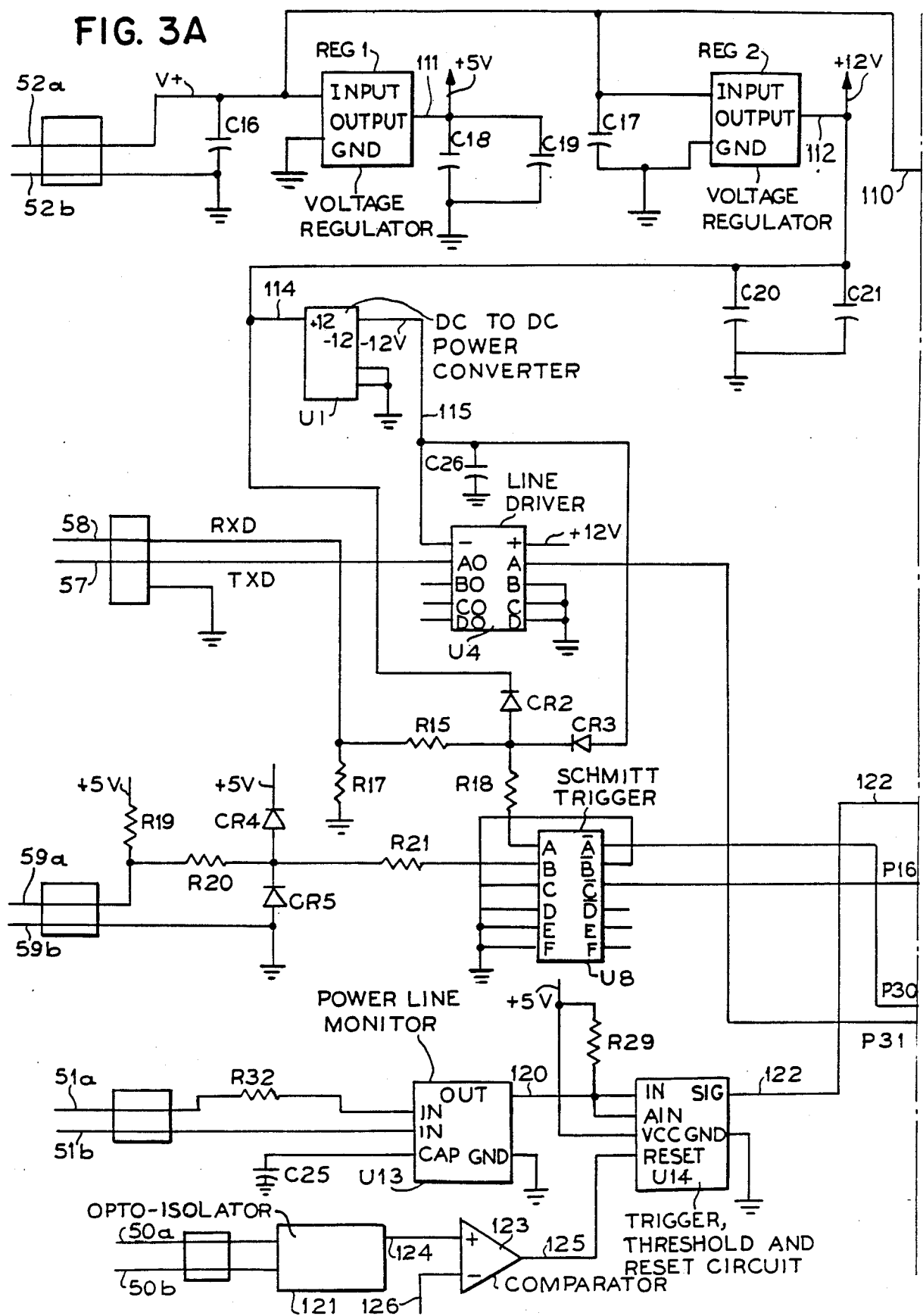

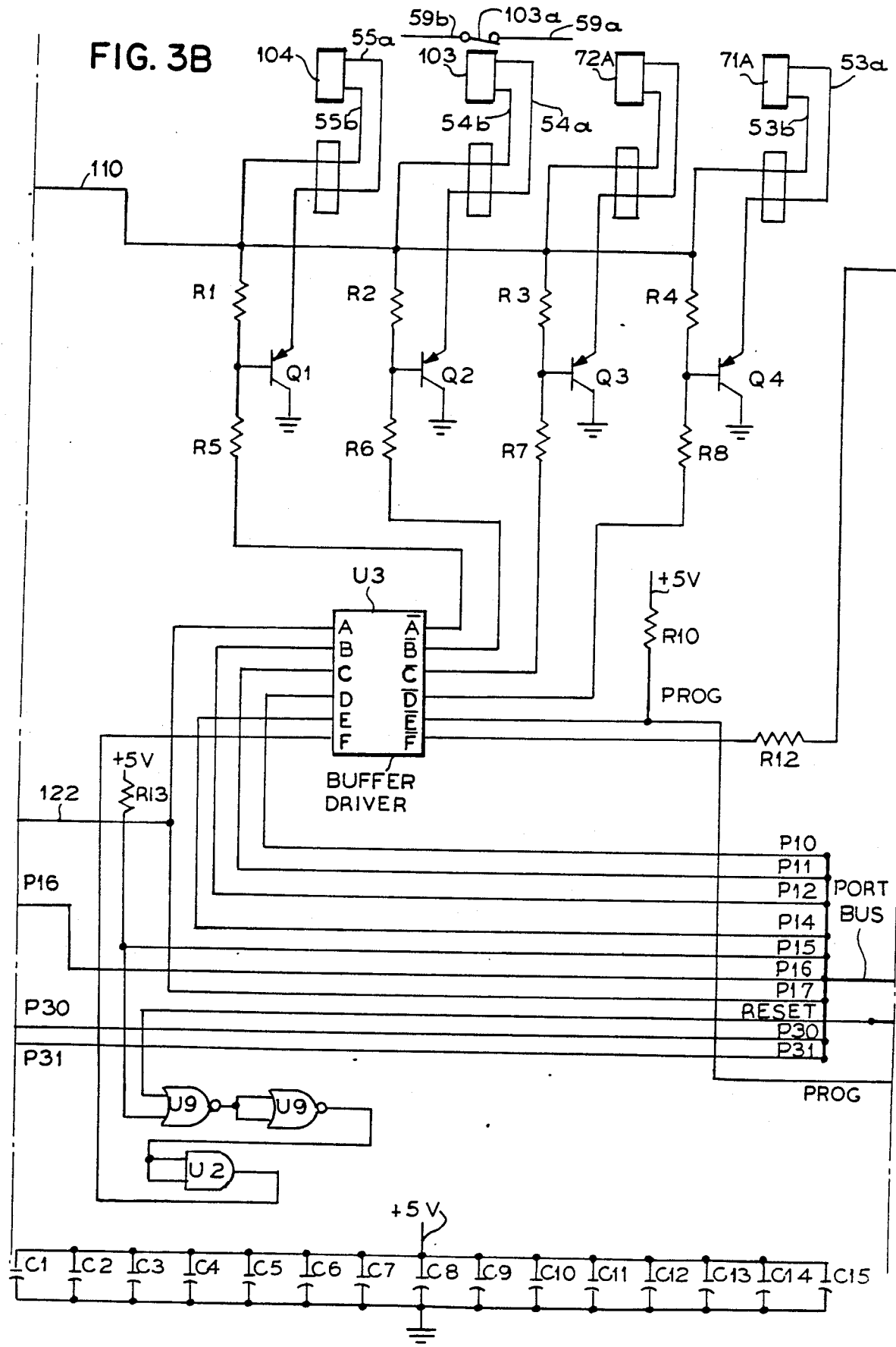

ISOLATED POWER SUPPLY SYSTEM AND METHOD

BACKGROUND OF THE INVENTION

This invention relates to a power supply system and method, and particularly to such a system and method wherein interference sensitive circuits of a utilization means can be isolated to a very high degree from the AC power line.

As an example, in mobile radio systems, there is a need for complex telecommunications circuitry in the vicinity of the radio transmitters e.g. for processing transmissions to and from a multiplicity of vehicles. In such an environment near field wattages will often be several thousands of watts, and AC service lines can couple disruptive signals through isolation transformers or other conventional RF emissions barriers.

SUMMARY OF THE INVENTION

In accordance with the present invention, power control means is provided which can operate on twelve volt battery power, for example. A plurality of battery means may be provided so that with one battery means supplying operating power to the system, one or more other batteries are completely isolated from the utilization circuitry and may be coupled to a charging circuit which is operated from an AC line. Thus, the active battery means can be effectively isolated from the AC line, while yet the system is capable of being continuously supplied with operating power. In one preferred embodiment, first and second batteries are alternately connected to the utilization means and to the battery charging means, while a third battery means supplies power to the utilization means during switchover of the first and second batteries and/or during their replacement.

It is therefore an object of the present invention to provide a system which can be maintained by power from an alternating current power line while yet providing improved isolation from electromagnetic interference coupled with the power line.

Another object of the invention is to provide an isolated DC power supply system wherein the battery means supplying power to an RF sensitive utilization means is isolated from the battery charging means by mechanically movable switch contacts for providing an extremely high degree of spacial isolation at reasonable cost.

A feature of the invention resides in a system achieving one or more of the preceding objects and incorporating first and second battery means alternately connectable to a utilization means and to a charger, wherein a third battery means supplies power to the utilization means during commutation between the first and second battery means and/or during replacement of the battery means.

A further feature relates to a power control module for automatically handling AC power line failure and/or loss of DC power, preferably further supervising switchover between first and second battery means according to selected criteria, and supervising operation under various other contingencies (e.g. sequencing a restart of the system when power is restored after a power outage).

It is another object of the invention to provide a power control module for supervising supply of isolated DC power, and readily adaptable to different types of battery means and/or to different environmental requirements, and the like.

A still further object is to provide a DC power supply wherein transients and switching noise are suppressed even during changeover to a new battery or the like.

Another and further object is to provide an isolated power supply system wherein the system is able to determine battery condition and sequence required load shifting and/or shut down the system under selectable circumstances.

A preferred power control module may include circuitry to initiate emergency cooling in the event of an AC power line failure.

A preferred power control module as constructed and tested has been found to be highly reliable in maintaining the required extreme isolation from electrical disturbances at the AC power line.

Other objects, features and advantages of the invention will be apparent from the following detailed description, taken in connection with the accompanying drawings, and from the respective recitations of the individual claims appended hereto.

BRIEF DESCRIPTION OF THE DRAWINGS

FIGS. 3A, 3B, 3C and 3D, taken together, show a preferred implementation of the power control means of FIG. 1.

DETAILED DESCRIPTION

Figure 1:
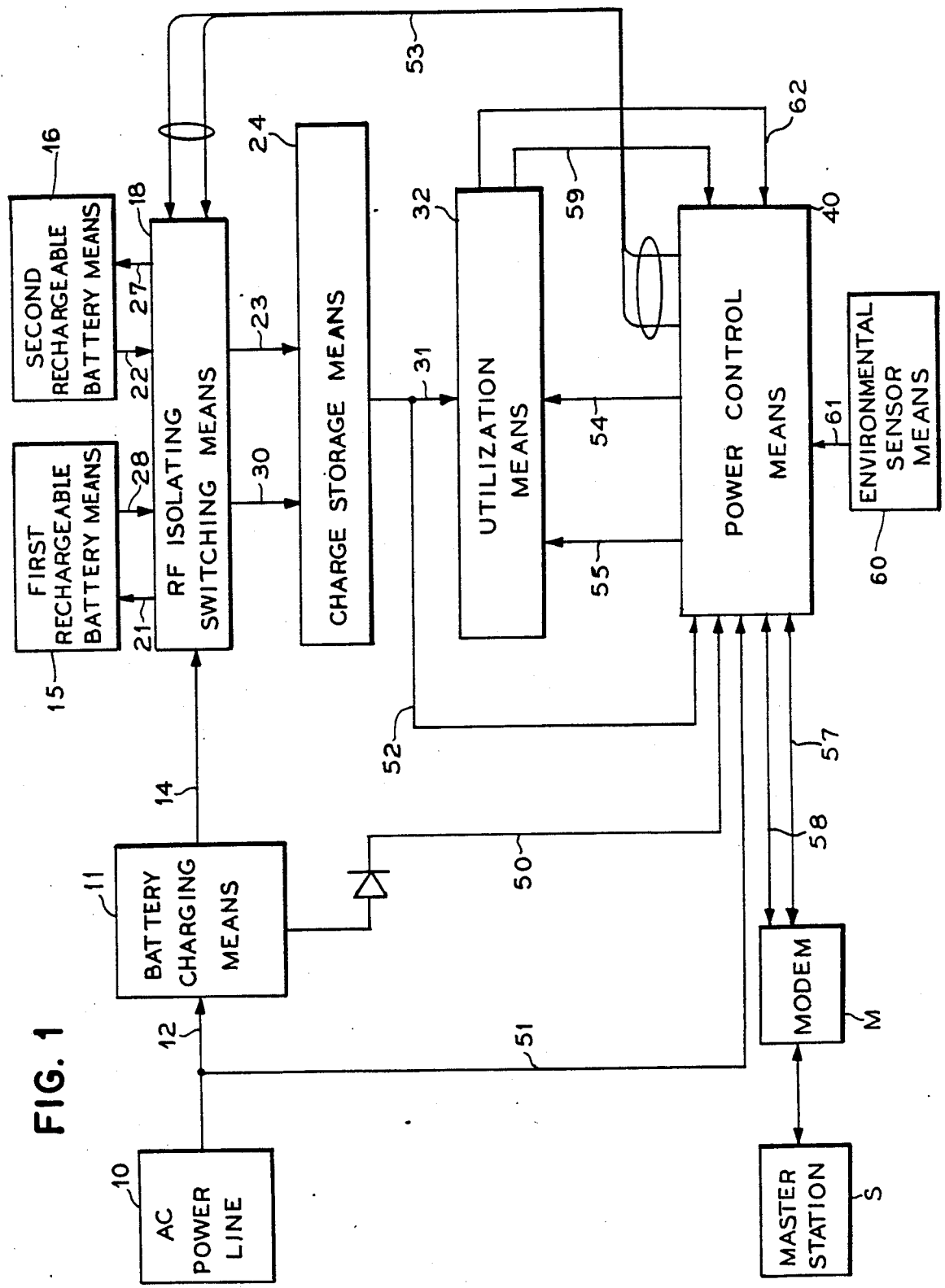
FIG. 1 is a block diagram for indicating preferred features of an isolated power supply system in accordance with the present invention.

Description of FIG. 1

FIG. 1 illustrates an exemplary system which is to be operated from an alternating current power line indicated at 10. A battery charging means 11 is shown as having charger input means 12 for coupling with the alternating current power line 10 and having charger output means 14 for supplying battery charging current to first and second rechargeable battery means 15 and 16 via a radio-frequency-isolating switching means 18. In one switching condition of the radio-frequency-isolating switching means 18, the battery charger output means 14 is connected via a line 21 with the first rechargeable battery means 15 while the second rechargeable battery means 16 is connected via lines 22 and 23 with a charge storage means 24. In a second switching condition of the switching means 18, the second rechargeable battery means 16 is connected with the charger output 14 via a line 27 while the first rechargeable battery means 15 is connected with the charge storage means 24 via lines 28 and 30. The charge storage means 24 in turn is connected via an output 31 with a utilization means 32, for supplying direct current operating power to the utilization means.

By way of example, in one practical embodiment, the utilization means 32 requires twelve volt direct current and contains telecommunications modules within the system which are very sensitive to any form of transient on the direct current supply line 31. With the particular utilization means referred to, the environment is very rich in radiated RF emissions since there are several RF transmitters operating within close proximity to the utilization means 32. Anticipated near field wattages are often several thousands of watts. Field strengths of this magnitude are significant enough that the AC service line as represented at 10 becomes an antenna and can couple signals into the sensitive equipment of the utilization means 32 in the absence of the RF isolating switching means 18.

To prevent the coupling of transients from the AC power line 10 to the power input 31 of the utilization means 32, the system of FIG. 1 provides isolation at the switching means 18 by completely decoupling the battery charger output 14 from the particular one of the battery means 15 and 16 which is acting to supply power to the utilization means 32. In a preferred example, the active one of the first and second batteries 15 and 16 provides charge to a third, lower capacity battery which implements the charge storage means 24. The two principal batteries provide charge to the third battery in a bucket-bridge fashion while the third battery of component 24 is always in parallel with the load. In this particular example, the principal batteries 15 and 16 are of the deep discharge type and are connected alternately to the load and the charger. In one example, commutation is accomplished at fifteen minute intervals. The third battery of component 24 then carries the load through the commutation process. During normal operation, utilization means 32 always has power, one of the principal batteries is always charging, and the other of the principal batteries is always driving the load. In this way, there is never a direct link for transient disturbances from the AC power line 10 to the direct current power output line 31.

In the particular example referred to above, the system of the utilization means 32 should operate through a power outage of typical duration. Such equipment can be used in emergency situations to provide vital communications links. In a particular embodiment where the AC line 10 is separated from the principal batteries of components 15 and 16 in a power failure mode, all three batteries 15, 16 and that of component 24 may all be switched to supply power to the utilization means 32 when no AC line voltage is present. In the case where there are limitations on the batteries, the system is preferably able to determine battery condition and to shut down the system as power reserves decline. A power control means 40 is indicated in FIG. 1 which may handle battery charging, may sample the condition of the power supply, may sample the presence of AC line voltage, may drive emergency cooling systems, and may serve to reset the entire system spontaneously or on command. Further, the power control means 40 may sample several parameters pertaining to the operations of the batteries. Also the power control means may handle all emergency power outage verification and may sequence the required load shifting to either power down or restart the systems. For the sake of illustration, the power control means 40 is indicated as monitoring direct current output from charger 11 via a line 50, and monitoring the alternating current potential from component 10 via a line 51. The direct current output from the charge storage means 24 is supplied to power control module 40 via a line 52. The RF isolating switching means 18 is controlled from module 40 via a control line 53. Further, by way of example, output control lines are indicated at 54 and 55 for controlling various functions within the utilization means 32, for example reset of the system and activation of emergency cooling systems. Further in a specific example, the power control means may be provided with communication lines as indicated at 57 and 58 which may, for example, be attached to any conventional RS-232 terminal such as modem M which may communicate with a remote station S. Preferably the power control means contains one or more programmable processor units so that the module can be tailored to specific requirements of a given programmed so that it resets and restarts itself properly for the given utilization means 32. Since the module 40 functions as the system supervisor it should never be powered down but should remain active even if the rest of the system has been deactivated. Because of the flexibility of the power control module 40, it can be adapted to many various power control functions.

For example, the system may not only be able to deal with a power loss by switching the battery means in parallel, but it also can determine whether a failure of a selectable time duration of the AC supply or of battery charger 11 has occurred and react accordingly. By way of example, output 54 may activate a main system reset relay to reset the entire system. Signals from other portions of the system via inputs 59 and 62 can initiate a reset through the power control module 40. Module 40 may have provision for analog to digital conversion so that the battery and environmental parameters can be sampled as required. Thus, FIG. 1 shows an environmental sensor means 60 coupled to the module 40 via a line 61. In a particular example, module 40 included circuitry to initiate emergency cooling where the main system of utilization means 32 relied upon AC driven air conditioners. In this case, when AC power or DC power vanishes, the module 40 switches to a battery backup mode. Since heat is still being generated inside the system enclosure, module 40 activates output line 55 to switch in a DC driven heat pipe cooling system. As an example, such a system may be rated at 2700 BTU and only require about forty watts of direct current power.

Figure 2:
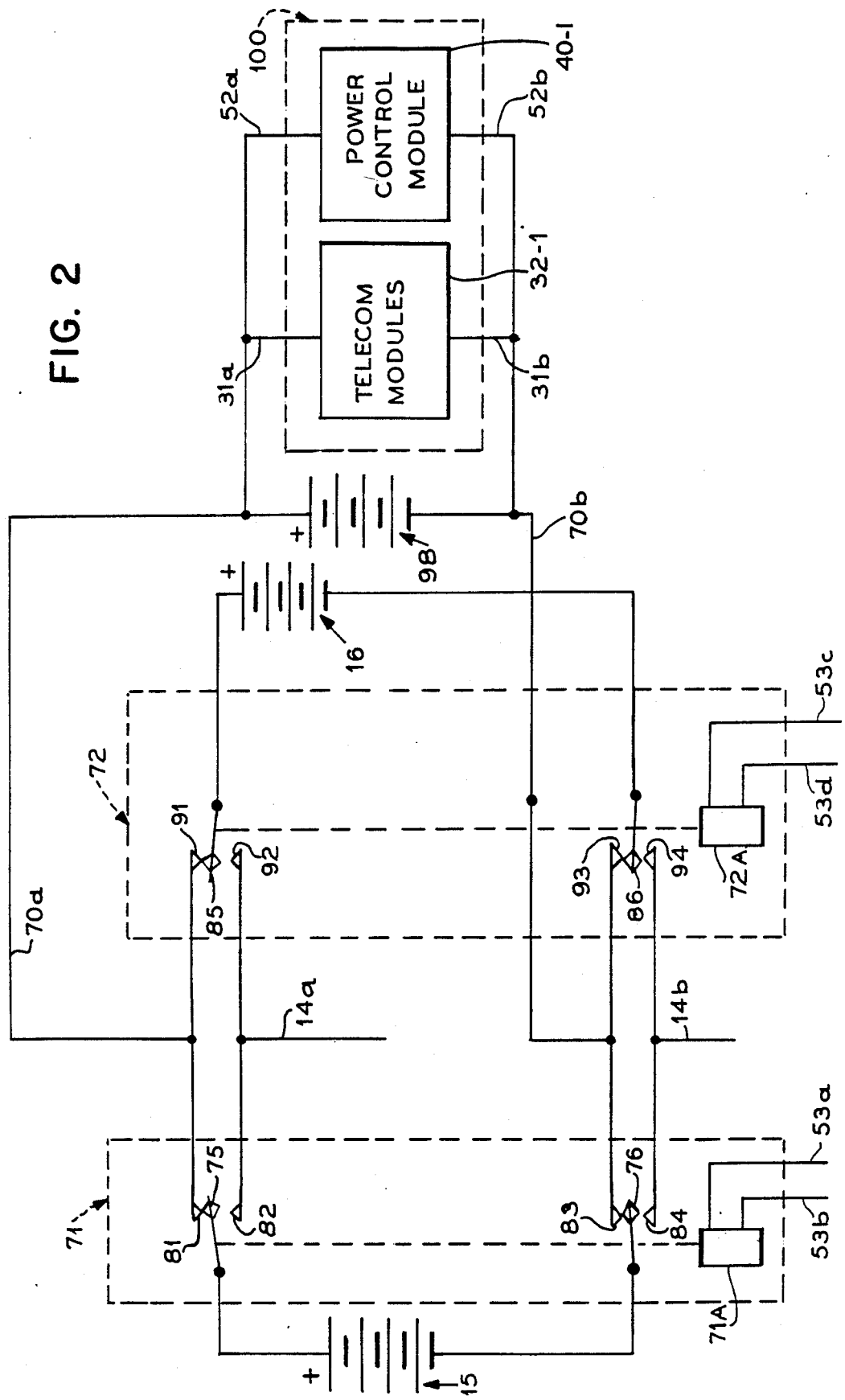
FIG. 2 shows a preferred implementation of the RF isolating switching means and charge storage means of FIG. 1.

Description of FIG. 2

FIG. 2 illustrates a specific example of RF isolating switching means 18 in association with a battery means 15 and 16. In this example, the battery charger output means comprises conductors 14a and 14b, and the output means from the RF isolating switching means 18 is represented by conductors 70a and 70b. In the embodiment of FIG. 2, the RF isolating switching means 18 is comprised of two relays 71 and 72 which include respective relay electromagnets 71A and 72A. Relay 71 further comprises movable contacts 75 and 76 and respective sets of stationary contacts 81, 82 and 83, 84. The relay 72 further comprises movable contacts 85 and 86 and associated sets of stationary contacts 91, 92 and 93, 94. With both relays deenergized, the movable contacts 75, 76 and 85, 86 are in their respective upper positions engaging the respective upper contacts 81, 83 and 91, 93. In this mode, the batteries 15 and 16 are connected in parallel between the conductors 70a and 70b.

Under normal operating conditions, one of the relays 71 and 72 will be energized and the other relay will be deenergized. Thus, when relay coil 71A is energized, contacts 75 and 76 will be connected with stationary contacts 82 and 84, and the battery 15 will receive charging power via the battery charger output conductors 14a and 14b. On the other hand, with the relay coil 72A deenergized, battery 16 will be connected with output lines 70a and 70b so as to supply power to the charge storage means indicated at 24 in FIG. 1 and specifically illustrated as a battery 98 in FIG. 2. As previously described, various circuitry of utilization means 32 and power control means 40 may be connected across the third battery 98 and this is represented by load 100 in FIG. 2. In one embodiment according to FIG. 1, the line 53 of FIG. 1 may represent a multiconductor cable for selectively energizing one or both of relay coils 71A and 72A, and accordingly the energizing conductors for the relay coils have been designated 53a, 53b and 53c, 53d.

As previously explained, a significant concept of the present invention resides in the provision of switching means such as relays 71 and 72 which serve to isolate transient disturbances at conductors 14a, 14b from the output conductors 70a and 70b both while the relays are deenergized, and where one or the other of the relays is energized while the other relay is deenergized. In this way, one or both of batteries 15 and 16 serves as a highly isolated power supply, the other battery desirably being charged when not active in supplying power, and desirably both batteries 15 and 16 being connectable in parallel in the event of a power failure. In FIG. 2, load 100 is indicated as comprising RF interference sensitive telecommunications modules 32-1, and a power control module 40-1 as specifically shown in FIGS. 3A and 3B.

Description of FIGS. 3A through 3D

FIGS. 3A, 3B, 3C and 3D illustrate a specific preferred implementation of power control means 40. To assist in correlating FIGS. 1 and 2 with FIGS. 3A to 3D, relay coils 71A and 72A have been indicated at the upper part of FIG. 3B, and input conductors 52a and 52b corresponding to line 52 in FIG. 1 have been indicated at the upper left in FIG. 3A. Also conductors 57 and 58 of FIG. 1 have been indicated at the left in FIG. 3A, and master reset conductors 59a and 59b, corresponding to reset input 59 of FIG. 1 have been indicated at the lower left of FIG. 3A along with input conductors 51a and 51b which correspond with line 51 in FIG. 1. A relay coil 103 shown at the upper part of FIG. 3B may be energized via conductors 54a and 54b corresponding with output line 54 of FIG. 1, and a relay coil 104 is shown at the upper left in FIG. 3B with energization via conductors 55a and 55b corresponding with line 55 of FIG. 1. For the sake of a more detailed illustration, relay coil 103 is shown as having an associated movable contact 103a for controlling continuity between lines 59a and 59b. If for example the contacts of relay 103 are normally closed, energization of the relay will remove ground potential from conductor 59a and initiated a reset operation.

Relay 104 may similarly control a movable contact associated with conductors for activating the emergency cooling system referred to in connection with the description of FIG. 1.

Referring to FIG. 2, conductors 52a and 52b will be connected with the terminals of the third battery means 98 so that power is supplied to the power control means of FIGS. 3A to 3D as generally represented at 52 in FIG. 1. The DC power is applied to a five volt regulator component REG1 and to a twelve volt regulator component REG2. As indicated at 110, the input DC power is also supplied to respective first terminals of the relay coils 71A, 72A, 103 and 104. The output 111 of REG1 supplies plus five volts to various components of the circuit of FIGS. 3A to 3D while the output 112 of REG2 supplies plus twelve volts to various points in the circuitry as indicated. The output 112 of REG2 is also connected with an input 114 of a DC to DC power converter component U1 so as to supply minus twelve volts at output 115. The plus and minus twelve volt outputs are supplied to respective inputs of a line driver and receiver component U4 which is associated with communication conductors 57 and 58.

Component U13 at the lower center of FIG. 3A is a General Instrument power line monitor chip. It's function in the circuit is to provide a signal when line power (120VAC) vanishes for some reason. The output of U13 at 120 is supplied to a trigger input and to a threshold input of a component U14 which may be implemented as a type NE555 linear integrated circuit. The two inputs of component U14 are also coupled to the plus five volt supply via a resistor R29. Component U14 functions as a Schmitt trigger circuit and as a logic gate. Component U14 monitors for the presence of DC power via input lines 50a and 50b corresponding to line 50, FIG. 1, which drive an opto-isolator 121 and also monitors via component U13 for the presence of the AC supply voltage. Component U14 will thus supply an output signal at 122 whenever there is a failure of either the DC power or of the AC supply voltage. When both AC and DC signals are present, the logic gate signals that the power is proper. In the particular circuit illustrated, it is immaterial whether the DC power supply has failed or whether the system has suffered an AC power failure. A buffer comparator 123 is connected between an analog output line 124 of isolator 121 and a reset input 125 of component U14. A threshold control line 126 of comparator 123 selects the level of isolator output which resets component U14 and thus signals a power failure.

Figure 3C:
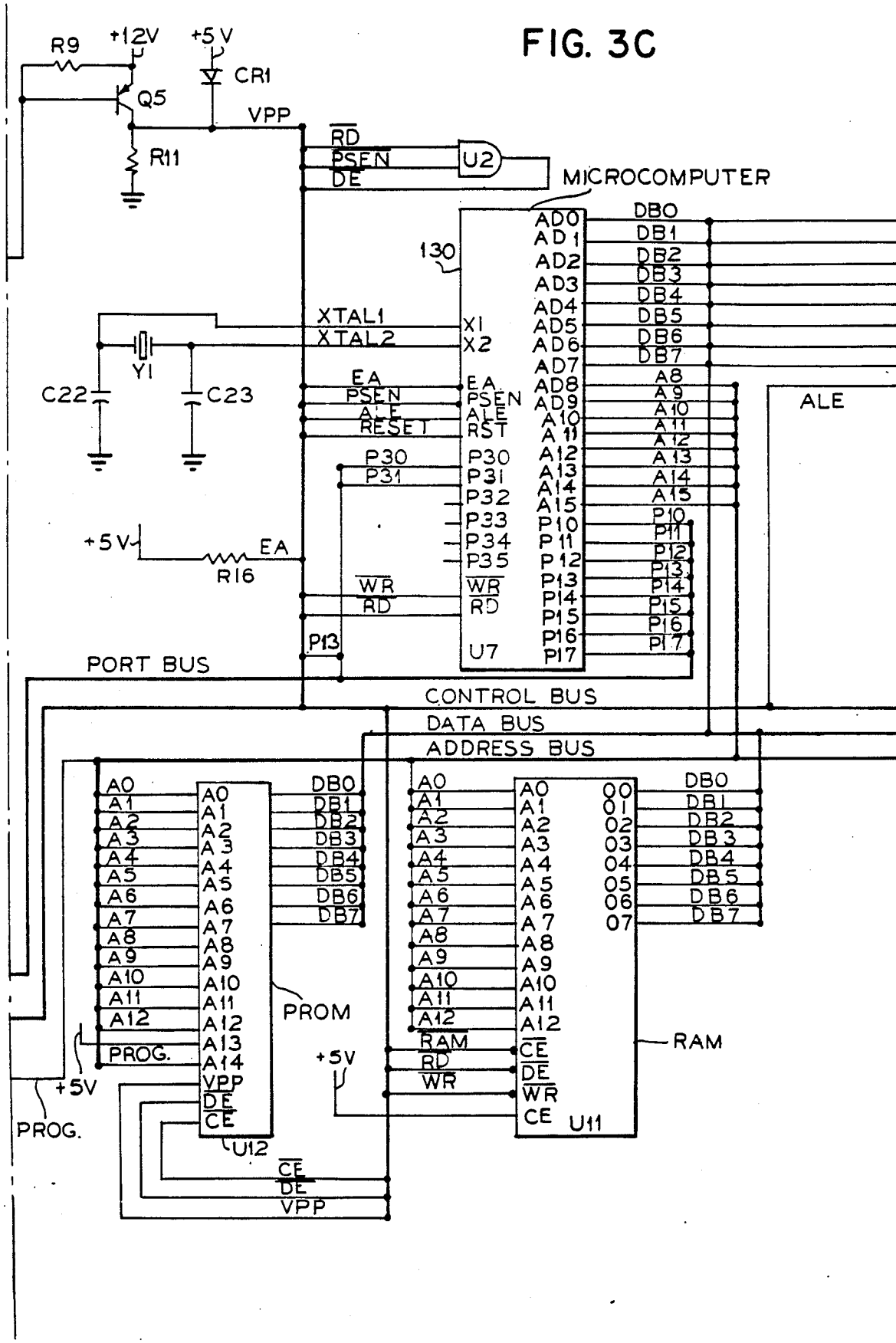
Figure 3D:
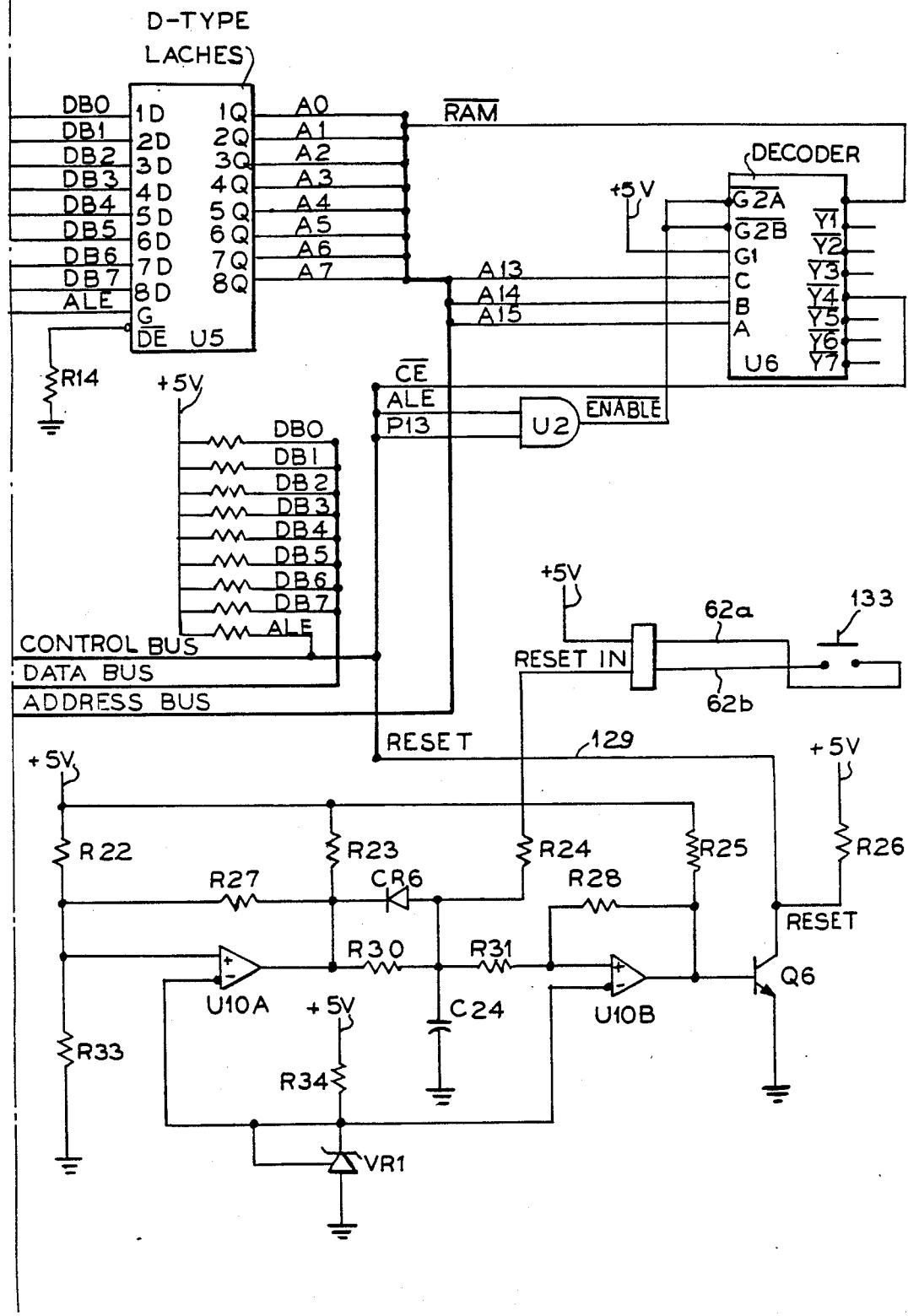

FIG. 3D shows input conductors 62a and 62b which may correspond with the reset signal input line 62 of FIG. 1. When a plus five volt potential is applied to conductor 62b in FIG. 3B, comparator U10B is actuated to supply a ground potential output which shuts off transistor Q6 and produces a RESET signal. This signal is supplied via conductor 129 to a RST input of microprocessor 130. The reset signal may also be automatically generated and supplied to the microprocessor when power is first applied to the system.

Exemplary parameters for the specific circuit of FIGS. 3A through 3D are given in the following tabulation.

| REG1 | (SAU 3052) | Voltage regulator with heatsink and insulator for supplying regulated +5V DC. |
|---|---|---|
| REG2 | (LM340T-12) | Voltage regulator with heatsink for supplying regulated +12 V DC, e.g. to U4 at Pin 14. |
| U1 | (V12R12) | DC to DC power converter for supplying minus 12 V DC at output 115. |
| U2 | (74LS08) | Quad 2-input AND gate |
| U3 | (7417) | Hex buffer driver with open-collector high-voltage outputs |
| U4 | (LTC 1032) | Line Driver operating in compliance with EIA RS-232C |
| U5 | (74HC573) | Octal D-type transparent laches with 3-state outputs |
| U6 | (74LS138) | 3-line to 8-line decoder/demultiplexer |
| U7 | (8052-40pin socket) | Microcomputer |
| U8 | (74C914) | Hex Schmitt Trigger |
| U9 | (4001) | Quadruple 2-input CMOS NOR gate |
| U10A, U10B | (LM393) | Dual Differential Comparators |
| U11 | (6264) | Random Access Memory |
| U12 | (2764) | 65,536-bit erasable programmable read-only memory |

-continued

| | | |
|---|---|---|
| U13 | (MID400) | General Instrument power line monitor |
| U14 | (NE555) | Combined Schmitt Trigger circuit (actuated when input falls below ⅓ VCC), threshold circuit (actuated when input falls below ⅔ VC) and reset circuit, providing a logical AND function. |
| 121 | | Opto-isolator |
| 123 | (CA 3160) | CMOS comparator |
| Relays 71, 72, 103, 104: | Magnecraft, stock no. W199X-12; contacts (30 amperes), DPDT; coil parameters, 12 VDC, 70 ohms, 2.0 watts. | |
| Transistors: | Q1 to Q4, TIP125 (with heatsink); Q5, 2N4403; Q6, 2N3904. | |
| Diodes: | CR1, 1N270; CR2 to CR6, 1N3064; VR1, LM385 (BZ-2.5). | |
| Capacitors: | C1 through C14, .1 microfarad; C15, 100 microfarads; C16, C17, .1 microfarad; C18, 220 microfarads; C19, .1 microfarad; C20, .1 microfarad; C21, 33 microfarads (16 volts); C22, C23, 22 picofarads; C24 .1 microfarad; C25, .01 microfarad; C26, 33 microfarads (16 volts). | |
| Crystal Y1, 11.0592 megahertz | | |
| Resistors: | R1 to R4, 47 kilohms; R5 to R8, 1.3 kilohms; R9, 10 kilohms; R10, one kilohm; R11, 10 kilohms; R12, 4.7 kilohms; R13, R14, 10 kilohms; R15, 47 kilohms; R16, 10 kilohms; R17, 6.8 kilohms; R18, 47 kilohms R19, 10 kilohms; R20, R21, 27 kilohms; R22, 6.81 kilohms (1%); R23, 10 kilohms; R24, one kilohm; R25, 10 kilohms; R26, one kilohm; R27, 301 kilohms (1%); R28, one megohm; R29, 4.7 kilohms; R30, 330 kilohms; R31, 100 kilohms; R32, 22 kilohms; R33, 8.25 kilohms (1%); R34, 10 kilohms | |
| Resistors | S1P1, 10 kilohms | |

Push button switch 133, Grayhill, Inc., part no. 30-3UL; normally open SPST; rating (115 V AC Resistive), 5 amperes,
Mechanical housing - 19 inch aluminum chassis; height of front panel, 88.1 millimeters (3.47 inches); depth dimension, 260 millimeters (10.24 inches); width dimension of front panel 482.6 millimeters (19.00 inches); top cover, .06 inch thick perforated aluminum, 10.13 inches by 17.25 inches; base plate, .06 inch thick aluminum, 10.06 inches by 17.13 inches.

Exemplary Sequence of Operation for FIGS. 3A through 3D (Refers to actions to be taken by the microprocessor 130, FIG. 3B)

| | |
|---|---|
| Part 1 | Turn on relay 103 (to effect a reset of the system) Turn off relays 71 and 72 (to supply power to the system from batteries 15 and 16 in parallel) |
| Part 2 | Clear counter (provided internally of microprocessor 130) and begin counting clock pulses from crystal oscillator Y1. Turn relay 71 on, turn relay 72 off, (to begin charging of battery 15, FIG. 2) Loop 1 Sample power flag (which is responsive to a power failure signal from output 122 of U14), and jump in the event of a power failure to "NO PWR" herebelow. Check to see if the counter shows an elapsed time of twenty minutes. After each such check, return to "Loop 1" until the elapsed time of twenty minutes is reached, then jump to "Part 3" herebelow. |
| Part 3 | Clear the Counter Turn relay 71 off and turn relay 72 on (so that charging of battery 16 begins). Loop 2 Sample power flag and jump on no power, to "NO PWR" herebelow. Check to see if the counter has again registered an elapsed time of twenty minutes; if not, return to "Loop 2" until the elapsed time of twenty minutes has been reached, then jump to "Part 2" above. |
| NO PWR | Turn off both relay 71 and relay 72 (to connect batteries 15 and 16 in parallel with the third battery 98, FIG. 2). Clear counter and start counting clock pulses. Loop 3 Sample power flag If power comes on within twenty minutes, jump to "Part 1". If the power has not come on within twenty minutes, jump to "PWRFAL" (power failure is considered real, not temporary, at this point). |
| PWRFAL | Clear counter and start counting clock pulses. Loop 4 Sample the power flag. If power comes on, jump to "STARTUP" herebelow. Check the counter for an elapsed time of 120 minutes; return to "Loop 4" until timeout of the counter. If timeout occurs, turn off relay 103. Loop 5 Sample the power flag Jump to "Loop 5" on No Power Jump to "STARTUP" herebelow if power is present. |
| STARTUP | Turn on relay 72 Turn off relay 71 Clear counter and start counting clock pulses. Loop 6 Sample power flag If power goes off, turn on relay 72 and jump to "Loop 5" Check counter to see if it has reached a count corresponding to an elapsed time of twenty minutes and if not return to "Loop 6". Turn on relay 103 Jump to "Part 2" |

SUPPLEMENTARY DISCUSSION

As a specific example, relays 71 and 72 may provide a dielectric—withstanding—voltage between open contacts of at least about 1500 volts RMS. With this degree of isolation, it is found that even with near field wattages of several thousands of watts, the transient sensitive telecommunications modules of the utilization means are adequately isolated at the open relay contacts.

The first and second rechargeable battery means 15 and 16 may be conventional automotive lead acid storage batteries which are of the deep discharge type, and retain a relatively constant voltage above five volts, e.g. a relatively constant output voltage of twelve volts, during delivery of at least about eighty percent of rated capacity. The third battery means 98 may be of the nickel-cadmium type, with the same rated output voltage as battery means 15 and 16.

As previously explained, the power control means may include a microprocessor with a clock pulse source, e.g. Y1 as shown at the left in FIG. 3C, so that a counting of clock pulses enables measurement of operating time of a given battery means 15 or 16. Thus the microprocessor 130 may itself measure a parameter (time) related to the operational condition of the battery means; and the microprocessor 130, under the control of the time interval measurement, may effect a switchover to a newly charged battery means before the active battery means could be unduly discharged even with a maximum loading thereof by the utilization means.

In accordance with a method aspect of the present invention, the switching of a recharged battery means so as to energize the utilization means simultaneously causes such battery means to be spatially and inductively isolated from the alternating current power line 10.

It will be apparent that many modifications and variations may be effected without departing from the teachings and concepts of the present invention.

I claim as my invention:

1. In a system to be operated from an alternating current power line while providing isolation from electromagnetic interference coupled with the power line,
    battery charging means having charger input means for coupling with an alternating current power line and having charger output means for supplying battery charging current,
    first and second rechargeable battery means for selectively supplying electric power to a utilization circuit,
    radio-frequency-isolating switching means controlling connection of said charger output means with said first and second rechargeable battery means and having a first switching condition for electrically isolating said first rechargeable battery means from the charger output means during connection of the first rechargeable battery means with the utilization circuit so as to block transmission of electromagnetic interference from the alternating current power line to the first rechargeable battery means and thus to the utilization circuit via the battery charging means, while providing for supply of battery charging current from the battery charging means to the second rechargeable battery means; and having a second switching condition for electrically isolating said second rechargeable battery means from the charger output means during connection of the second rechargeable battery means with the utilization circuit so as to block transmission of electromagnetic interference from the alternating current power line to the second rechargeable battery means and thus to the utilization circuit via said battery charging means, while providing for supply of charging current from the battery charging means to the first rechargeable battery means, and
    control circuit means controlling switchover of said switching means between said first and second switching condition and comprising charge storage means for maintaining the supply of power to the utilization circuit during switchover between the first and second switching conditions, said charge storage means comprising a third rechargeable battery means connected with the utilization circuit and selectively connectable with the first and second rechargeable battery means under the control of said radio-frequency-isolating switching means.

2. A system according to claim 1, with said first and second rechargeable battery means being of the deep discharge type with a relatively constant output voltage above five volts during delivery of at least about eighty percent of rated capacity.

3. A system according to claim 2 with said first, second and third rechargeable battery means having a rated output voltage of at least about twelve volts.

4. A system according to claim 1, with said first and second rechargeable battery means being of the lead-acid type and said third rechargeable battery means being of the nickel-cadmium type.

5. A system according to claim 1, with said control circuit means monitoring the alternating current power line after a power failure and controlling a resumption of the alternate charging of the battery means under selected conditions.

6. A power control system for controlling coupling of battery power with a utilization means, said system comprising switching means for selectively coupling a battery means with a utilization means, and processor means controlling said switching means to effect selective coupling and decoupling of the battery means with the utilization means, said processor means being controlled to actuate the switching means such that the battery means is decoupled when its operational condition may be impaired, first and second battery means for supplying power to the utilization means, said switching means in a first switching condition connecting the first battery means to the utilization means and in a second switching condition disconnecting the first battery means from the utilization means and connecting the second battery means with the utilization means, and third battery means for supplying operating power to said utilization means during actuation of said switching means between said first switching condition and said second switching condition.

7. A power control system according to claim 6, with said first, second and third battery means being rechargeable battery means.

8. A system according to claim 7, with said first and second rechargeable battery means having a relatively constant output voltage above five volts during delivery of at least about eighty percent of rated capacity.

9. A system according to claim 8 with said first, second and third rechargeable battery means having a rated output voltage of at least about twelve volts.

10. A system according to claim 7, with said first and second rechargeable battery means being of the lead-acid type and said third rechargeable battery means being of the nickel-cadmium type.

11. A system according to claim 6, with control circuit means comprising said processor means monitoring the alternating current power line and disabling actuation of the switching means during a power failure, and after a power failure enabling resumption of actuation of the switching means under selected conditions.

12. A system according to claim 6, with said switching means comprising mechanically movable electrical contact means for providing a spatial isolation gap between one of said first and second battery means, and said third battery means.

13. A system according to claim 12, with said electrical contact means having a dielectric-withstanding-voltage of at least about 1500 volts AC RMS between open contacts.

14. In a system to be operated from an alternating current power line, battery charging means having charger input means for coupling with an alternating current power line and having charger output means for supplying battery charging current, first and second rechargeable battery means for selectively supplying electric power to a utilization circuit, switching means controlling connection of said charger output means with said first and second rechargeable battery means and having a first switching condition for electrically isolating said first rechargeable battery means from the charger output means during connection of the first rechargeable battery means with the utilization circuit, while providing for supply of battery charging current from the battery charging means to the second rechargeable battery means; and having a second switching condition for electrically isolating said second rechargeable battery means from the charger output means during connection of the second rechargeable battery means with the utilization circuit, while providing for supply of charging current from the battery charging means to the first rechargeable battery means, and control circuit means controlling switchover of said switching means between said first and second switching condition and comprising third charge storage battery means for maintaining the supply of power to the utilization circuit during switchover between the first and second switching conditions.

15. A system according to claim 14, with said switching means comprising mechanically movable electrical contact means for providing a spatial isolation gap between the charger output means and the one of said battery means connected to the utilization circuit.

16. A system according to claim 15, with said electrical contact means having a dielectric-withstanding-voltage of at least about 1500 volts AC RMS between open contacts.

17. A system according to claim 14, with said charge storage battery means comprising a third rechargeable battery means.

18. A system according to claim 14, with said first and second rechargeable battery means providing a relatively constant output voltage above five volts during delivery of at least about eighty percent of rated capacity.

19. A system according to claim 14, with said first and second rechargeable battery means and said third charge storage battery means each having a rated output voltage of at least about twelve volts.

20. A system according to claim 14, with said first and second rechargeable battery means being of the lead-acid type and said third charge storage battery means being of the nickel-cadmium rechargeable type.

21. A system according to claim 14, with said control circuit means monitoring the alternating current power line after a power failure and controlling a resumption of the alternate charging of the first and second rechargeable battery means under selected conditions.

22. The method of operating an interference sensitive utilization means from an alternating current power line, which comprises providing plural rechargeable battery means each capable of providing operating power for the utilization means, switching one of the battery means in circuit with the alternating current power line so as to supply charging current thereto, and switching the other of the battery means so as to be spatially isolated from the alternating current power line but so as to act as an active battery means effectively coupled with the utilization means for the transfer of stored charge thereto, automatically switching over the roles of the respective rechargeable battery means such that in operation of the utilization means operating power can be indefinitely supplied to the utilization means while insuring against coupling of transients on the alternating current power line to the utilization means throughout such operation, and storing charge in a further charge storage battery means connected with the utilization means, from the active one of said rechargeable battery means such that the further charge storage battery means insures against transients and switching noise during switchover of the roles of the rechargeable battery means.

23. A method according to claim 22, with the automatic switching of the roles of the rechargeable battery means taking place at respective time intervals within the capacity of the respective active battery means to supply maximum operating power to the utilization means.

* * * * *